(12) United States Patent
Hunt

(10) Patent No.: US 8,050,568 B2
(45) Date of Patent: Nov. 1, 2011

(54) FREE-SPACE SENSOR NETWORK

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 450 days.

(21) Appl. No.: 12/276,764

(22) Filed: Nov. 24, 2008

(65) Prior Publication Data
US 2010/0272443 A1    Oct. 28, 2010

(51) Int. Cl.
*H04B 10/00* (2006.01)
(52) U.S. Cl. .......................................... 398/115; 398/118
(58) Field of Classification Search .................. 398/115, 398/118; 340/531, 539.1, 572.8; 342/165, 342/357.14, 357.48, 450, 464; 455/12.1, 455/13.1, 67.14, 67.16; 701/3, 4, 7, 9, 301
See application file for complete search history.

(56) References Cited

U.S. PATENT DOCUMENTS

| | | | | |
|---|---|---|---|---|
| 6,294,925 B1 | 9/2001 | Chan et al. | ...... | 326/37 |
| 6,314,163 B1 * | 11/2001 | Acampora | ...... | 379/56.2 |
| 6,832,251 B1 * | 12/2004 | Gelvin et al. | ...... | 709/224 |
| 6,891,660 B2 | 5/2005 | Hunt et al. | ...... | 359/334 |
| 6,917,426 B2 | 7/2005 | Hunt | ...... | 356/364 |
| 6,967,765 B2 | 11/2005 | Hunt | ...... | 359/326 |
| 7,067,793 B2 | 6/2006 | Hunt | ...... | 250/214.1 |
| 7,076,367 B2 * | 7/2006 | Du | ...... | 701/301 |
| 7,196,621 B2 * | 3/2007 | Kochis | ...... | 340/539.13 |
| 7,277,414 B2 * | 10/2007 | Younis et al. | ...... | 370/338 |
| 2010/0127852 A1 * | 5/2010 | Hunt | ...... | 340/531 |

OTHER PUBLICATIONS

Smith, Edward Jr. et al; "Towards a Synthesis of Complex Adaptive Systems Theory and Effects Based Approaches to Operations, Warfighters to Coalitions: A Case Study of Multi-level Adaptation in Effects-Based Operations" 11th ICCRTS Cambridge, UK Sep. 2006 Draft Paper.

* cited by examiner

*Primary Examiner* — Loha Ben
(74) *Attorney, Agent, or Firm* — Klintworth & Rozenblat IP LLC

(57) ABSTRACT

A free-space network may include: a plurality of geographically distributed free-space sensors for sensing at least one target; a networking apparatus for combining sensed information regarding at least one target from the geographically distributed free-space sensors; a target information device for communicating to at least one user combined sensed information regarding at least one target, from the geographically distributed free-space sensors, as provided by the networking apparatus; and at least one communication link connecting in free-space the geographically distributed sensors, the networking apparatus, and the target information device.

20 Claims, 2 Drawing Sheets

FREE-SPACE SENSOR NETWORK

FIELD OF THE INVENTION

The present disclosure relates to a free-space sensor network.

BACKGROUND

Many present sensing systems for sensing and physically characterizing targets, such as for sensing combat targets during warfare, are based on singular types of sensors based on single platforms. Singular sensors may only detect one type of physical characteristic. When sensors are all placed on a single platform, targets may only be sensed in point-to-point architectures. The sensing capability, target identification, and physical state, may be severely limited in this configuration. Point-to-point sensing geometries may require that all of the hardware necessary to perform end-to-end optical interrogation of a target be placed on one platform. This may create technical challenges and limitations on the platform that has to carry it, particularly problematic in air-borne or space-borne systems.

Tactical battle-spaces frequently have obscurations or short distance horizons, severely limiting sensing capability. Imaging sensors which can only view a target from one vantage point may only produce two-dimensional images. In environments where data acquisition is challenging, or line of sight is compromised, additional resolution may not provide actionable information to the user in question. In addition, there may be no means for combining different types of information collected by different types of sensors. Nor may there be a means to connect the information taken by sensors located at different physical locations in order to provide different perspectives of the object. Many of the present sensor systems utilize basic sensor fusion. For example, they typically do not invoke the Baysian algorithms necessary to get to a broader definition of fusion. Most sensor systems use the same type of sensor and do not combine information from multiple sensors. The sensor information is typically processed with a platform, but with local processing, it may be next to impossible to connect to the fully processed data from other sources. The combat vehicle operator usually has multiple screens showing information from different sensors regarding the target, and has to do the interpretation himself, instead of having it done automatically and algorithmically, with computers providing actionable information instead of unprocessed data. This gives the operator less time to engage in specific mission tasks, for example, target combat.

A network and/or method of is needed to address one or more problems associated with one or more of the existing networks and/or methods.

SUMMARY

In one embodiment, a free-space sensor network may be provided. The free-space network may include: a plurality of geographically distributed free-space sensors for sensing at least one target; a networking apparatus for combining sensed information regarding at least one target from the geographically distributed free-space sensors; a target information device for communicating to at least one user combined sensed information regarding at least one target, from the geographically distributed free-space sensors, as provided by the networking apparatus; and at least one communication link connecting in free-space the geographically distributed sensors, the networking apparatus, and the target information device. At least two of the sensors may be of different types.

In another embodiment, a different free-space combat sensor network may be provided. The free-space network may include: a plurality of geographically distributed free-space sensors for sensing at least one combat target; a networking apparatus for combining sensed information regarding at least one combat target from the geographically distributed free-space sensors; a combat target information device for communicating to at least one user combined sensed information regarding at least one combat target, from the geographically distributed free-space sensors, as provided by the networking apparatus; and at least one communication link connecting in free-space the geographically distributed sensors, the networking apparatus, and the combat target information device. The networking apparatus may comprise at least one free-space optical communications network for allowing a plurality of users to communicate.

In still another embodiment, a method of communicating over a free-space network may be provided. In one step, at least one target may be sensed using a plurality of geographically distributed free-space sensors. In another step, sensed target information regarding the at least one target from the geographically distributed free-space sensors may be sent over at least one communication link to a networking apparatus. In an additional step, the sensed target information regarding the at least one target may be combined using the networking apparatus. In yet another step, the combined sensed target information regarding the at least one target may be communicated to a user through a target information device.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
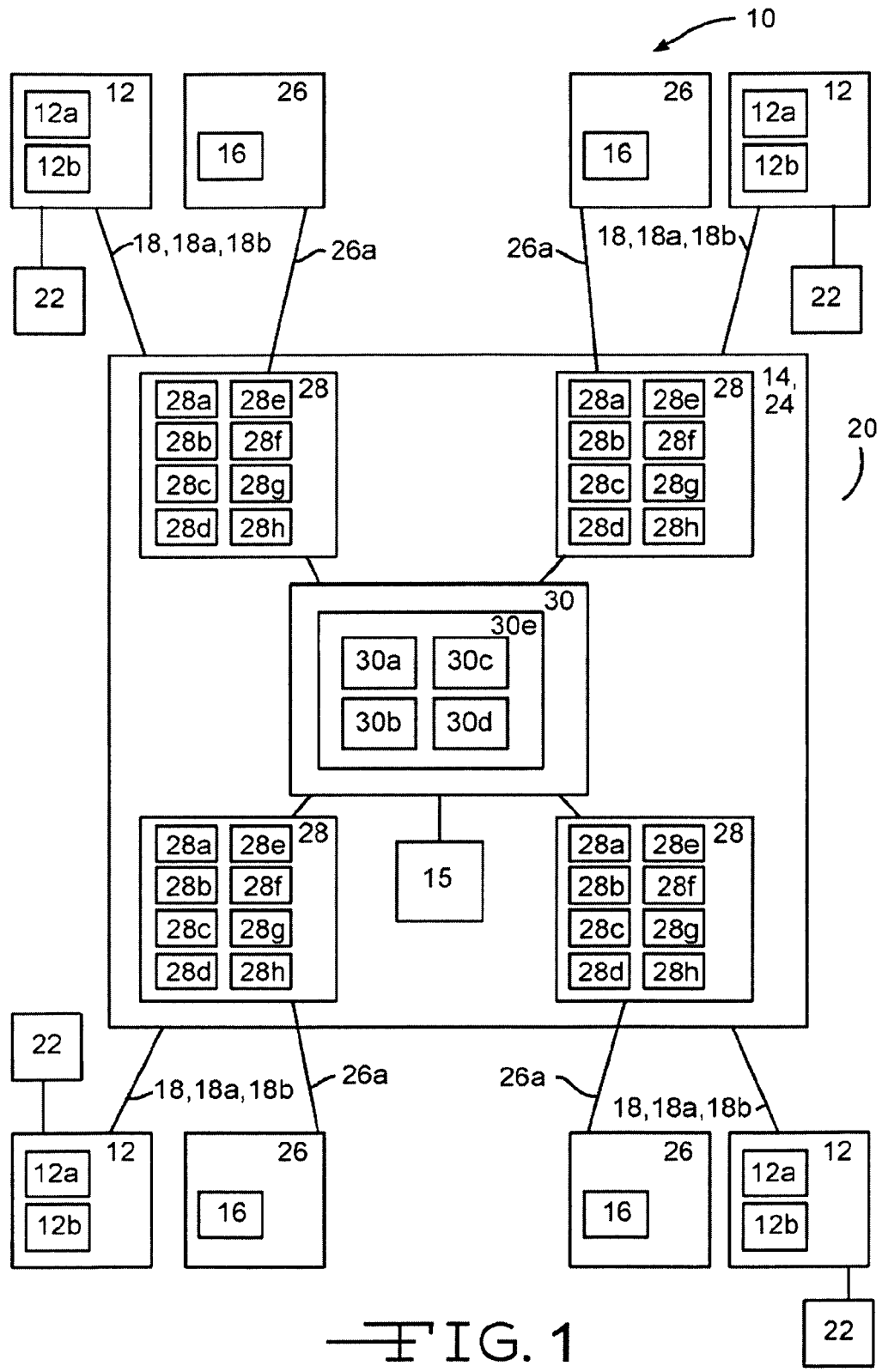
FIG. 1 is a box diagram illustrating an exemplary embodiment of a free-space network.

FIG. 1 is a box diagram of one embodiment of a free-space network 10. The free-space network 10 may include: a plurality of geographically distributed free-space sensors 12, a networking apparatus 14, one or more target information devices 16, and at least one communication link 18. Each of the components 12-18 of the network 10 may be geographically dispersed in free-space 20 relative to one another, and may be in, over, under, and/or on ground, air, water, and/or space. In other embodiments, the configuration of the free-space network 10 may vary, different numbers of the components 12-18 may be used, and/or other types of components may be used.

The geographically distributed free-space sensors 12 may include different types of sensors 12 which are geographically distributed in varying positions, orientations, and/or configurations in order to obtain varying types of information regarding one or more targets 22 from varying locations. The sensors 12 may include one or more spectral sensors 12a, one or more imaging sensors 12b, and/or other types of sensors 12 for obtaining varying types of information regarding the one or more targets 22. The sensors 12 may be adapted to collectively obtain real-time locations of the targets 22, directions of the targets 22, orientations of the targets 22, speeds of the targets 22, identifications of the targets 22, and/or other types of information regarding the targets 22. The one or more targets 22 being sensed by the sensors 12 may comprise combat targets such as hostile vehicles, hostile aircraft, hostile spacecraft, hostile tanks, hostile ships, hostile submarines, hostile satellites, hostile spacecraft, hostile missiles, hostile rockets, and/or other types of combat targets.

The free-space optical communications links 18 may be adapted to connect in free-space 20 the free-space sensors 12, the networking apparatus 14, and the target information devices 16 in order to allow each of the components 12-16 to communicate with each other regarding the information obtained by the sensors 12 related to the targets 22. The free-space optical communications links 18 may comprise optical lasers 18a, radio frequency links 18b, and/or other type of communications links 18.

The networking apparatus 14 may be adapted to combine the information sensed from the geographically distributed sensors 12 regarding the targets 22. The networking apparatus 14 may include and/or be attached to one or more processors 15. The one or more processors 15 may be adapted to process and/or combine the information sensed from the geographically distributed sensors 12 regarding the targets 22. The networking apparatus 14 may further comprise at least one free-space optical communications network 24 for allowing the information sensed from the geographically distributed sensors 12 regarding the targets 22 to be communicated to a plurality of cooperative users 26. The networking apparatus 14 may further allow the plurality of cooperative users 26 to communicate with each other. The cooperative users 26 may comprise friendly combat users such as friendly aircraft, friendly spacecraft, friendly ships, friendly tanks, friendly submarines, friendly satellites, friendly missiles, friendly rockets, friendly vehicles, and/or other types of friendly combat users. The cooperative users 26 may be adverse to the targets 22.

The free-space optical communications network 24 may be adapted to allow the cooperative users 26 to communicate with one another using optical propagation even if the cooperative users 26 are not aligned in a "line of sight." The free-space optical communication network 24 may be ground-based, air-based, water-based, and/or space-based. The free-space optical communications network 24 may comprise a plurality of free-space multi-channel relay converters 28 and a connection system 30 in communication with each of the free-space multi-channel relay converters 28. There may be a separate free-space multi-channel relay converter 28 for every cooperative user 26. Each cooperative user 26 may emit a signal beam 26a. Each of the separate free-space multi-channel relay converters 28 may be adapted to independently track a separate respective cooperative user 26. The free-space optical communications network 24 may comprise three or more multi-channel relay converters 28, and three or more cooperative users 26.

Each of the free-space multi-channel relay converters 28 may comprise: an optical telescope 28a for collecting and propagating light; a detector 28b for detecting light; an alignment cube 28c for providing location information to a cooperative user 26; an alignment laser 28d for finding and tracking a cooperative user 26; intensity conditioning optics 28e; polarization conditioning optics 28f; wavelength and optical bandwidth conditioning optics 28g; and optionally may additionally comprise adaptive optics 28h. In other embodiments, the free-space multi-channel relay converters 28 may comprise any combination and/or number of the listed components 28a through 28h. In still other embodiments, other types of components may be used.

The optical telescope 28a may be comprised of one or more optical elements, of either refractive or reflective nature. The optical design is meant only to collect electromagnetic radiation and does not need to image the cooperative users 26 in question. The detector 28b may be a simple photodiode which looks only for intensity or it may be an imaging plane, useful for physically locating the cooperative user 26. The alignment cube 28c may be a corner cube, composed of three mutually perpendicular reflective planes. The corner cube may have the property that any light pointed at it will be reflected along a path parallel to the incoming light. As such, it may send a return signal to an illumination source, providing a highly visible location signal for tracking. The alignment laser 28d may be any of several types, but a solid state medium laser, including diode lasers, are the preferable types. The laser 28d may be mounted on the side of the telescope 28a or it may be mounted in such a way as to propagate out through the telescope 28a. The intensity conditioning optics 28e may include optical filters or may include other control techniques, such as polarizer/rotator combinations. The polarization conditioning optics 28f may include optical elements which may have polarization sensitivity. This may include polarizers, but may also include other polarization sensitive optical elements, such as waveplates. The bandwidth elements of the wavelength and optical bandwidth conditioning optics 28g will typically be an interference filter, such as a Fabry-Perot interferometer, and the wavelength control will typically have a broader spectral effect, such as a spectral filter or diffraction grating.

The connection system 30 may include an internal alignment reference 30a and steering mirrors 30b. In one embodiment, there may be one set of steering mirrors 30b for each of the free-space multi-channel relay converters 28. The internal alignment reference 30a may comprise a point in three-dimensional space such as a hard target, or a light spot exiting an optical fiber, or a hard target located at the end of a fiber. In other embodiments, the internal alignment reference 30a may comprise varied types of internal alignment references. The connection system 30 may further comprise a combination of optical beam splitters 30c and combiners 30d for aligning the plurality of free-space multi-channel relay converters 28 with one another to allow the cooperative users 26 to communicate. The fiber optics 30e of the connection system 30 may comprise one or more of the internal alignment reference 30a, steering mirrors 30b, optical beam splitters 30c, and combiners 30d. Each of the free-space multi-channel relays converters 28 may be adapted to independently align itself with the internal alignment reference 30a. The connection system 30 may be adapted to align the plurality of free-space multi-channel relay converters 28 with one another to allow the cooperative users 26 to communicate.

The target information devices 16 may comprise displays, monitors, audio devices, processors, vehicles, aircraft, satellites, spacecrafts, rockets, missiles, ships, submarines, and/or other types of target information devices. The target information devices 16 may be adapted to communicate to the cooperative users 26 combined sensed information, as determined by the networking apparatus 14, from the geographically distributed sensors 12 regarding the targets 22. The combined sensed information communicated by the target information devices 16 to the cooperative users 26 may comprise real-time locations of the targets 22, directions of the targets 22, orientations of the targets 22, speeds of the targets 22, identifications of the targets 22, and/or other types of information regarding the targets 22. In such manner, the cooperative users 26 may be given a variety of combined information regarding the targets 22, as obtained by the plurality of geographically distributed sensors 12, in order to give the cooperative users 26 a complete picture regarding the targets 22. This may be invaluable during combat.

Figure 2:
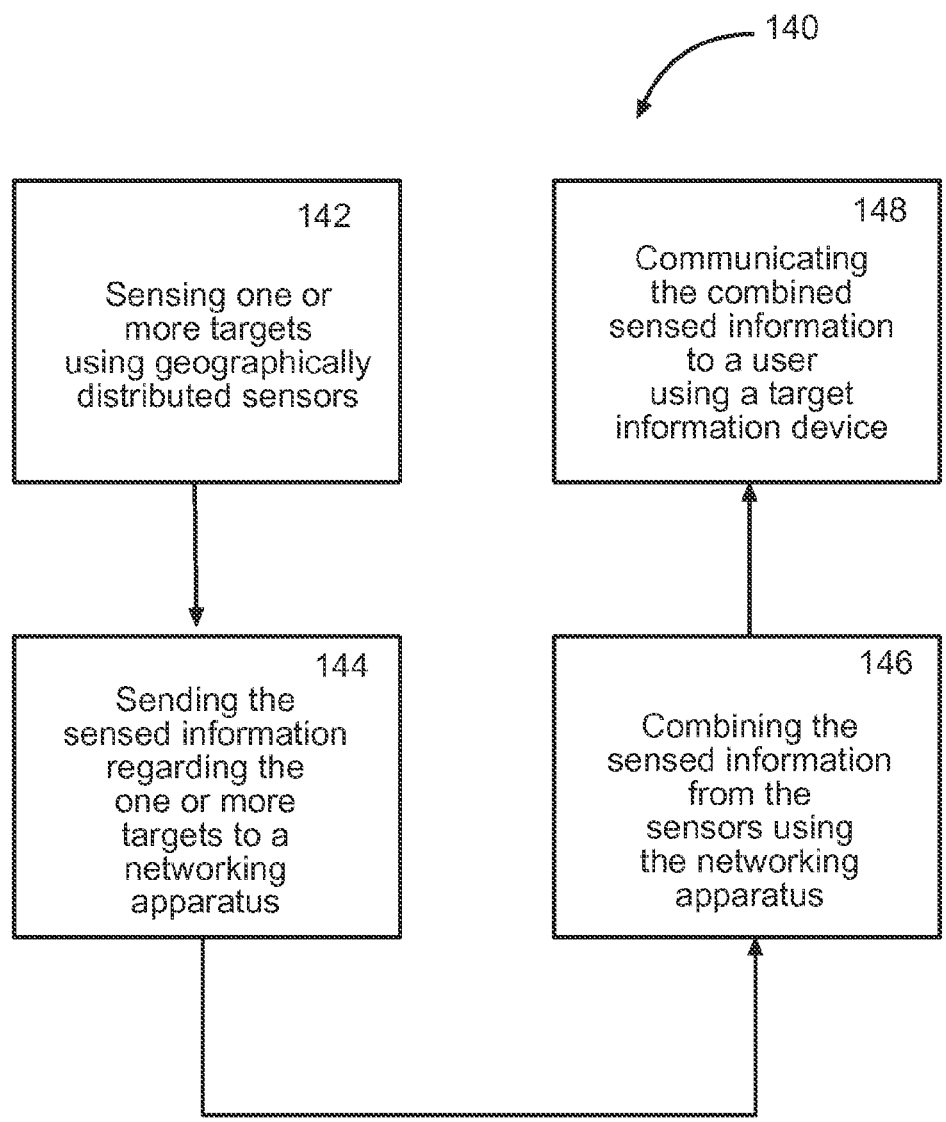
FIG. 2 is a flowchart of one embodiment of a method of communicating over a free-space network. As used herein, the term exemplary indicates an example and not necessarily an ideal.

FIG. 2 is a flowchart of one embodiment of a method 140 of communicating over a free-space network 10. The method may be used to communicate information regarding a combat target 22 to a friendly user 26 at least one of in, over, under, and on at least one of space, air, ground, and water. In step 142, at least one target 22 may be sensed using a plurality of geographically distributed free-space sensors 12. The geographically distributed free-space sensors 12 may include different types of sensors 12 which are geographically distributed in varying positions, orientations, and/or configurations in order to obtain varying types of information regarding one or more targets 22 from varying locations. The sensors 12 may include one or more spectral sensors 12a, one or more imaging sensors 12b, and/or other types of sensors 12 for obtaining varying types of information regarding the one or more targets 22. The sensors 12 may obtain real-time locations of the targets 22, directions of the targets 22, orientations of the targets 22, speeds of the targets 22, identifications of the targets 22, and/or other types of information regarding the targets 22. The one or more targets 22 being sensed by the sensors 12 may comprise combat targets such as hostile vehicles, hostile aircraft, hostile spacecraft, hostile tanks, hostile ships, hostile submarines, hostile satellites, hostile spacecraft, hostile missiles, hostile rockets, and/or other types of combat targets In step 144, sensed target information regarding the at least one target 22 from the geographically distributed free-space sensors 12 may be sent over at least one communication link 18 to a networking apparatus 14. The free-space optical communications links 18 may comprise optical lasers 18a, radio frequency links 18b, and/or other type of communications links 18. The networking apparatus 14 may comprise a processor 15 and/or a free-space optical communications network 24. The free-space optical communication network 24 may comprise a plurality of free-space multi-channel relay converters 28 and a connection system 30 comprising an internal alignment reference 30a and steering mirrors 30b. In other embodiments, the networking apparatus 14 may vary.

In step 146, the sensed target information regarding the at least one target 22 may be combined using the networking apparatus 14. This may provide combined thorough information regarding the at least one target 22 due to the combined collection of target information taken from all of the geographically distributed free-space sensors 12. The combined information may include real-time locations of the targets 22, directions of the targets 22, orientations of the targets 22, speeds of the targets 22, identifications of the targets 22, and/or other types of information regarding the targets 22.

In step 148, the combined sensed target information regarding the at least one target 22 may be communicated to a user 26 through a target information device 16. The target information devices 16 may comprise one or more displays, monitors, audio devices, processors, vehicles, aircraft, satellites, spacecrafts, rockets, missiles, ships, submarines, and/or other types of target information devices. The combined sensed information communicated by the target information devices 16 to the cooperative users 26 may comprise real-time locations of the targets 22, directions of the targets 22, orientations of the targets 22, speeds of the targets 22, identifications of the targets 22, and/or other types of information regarding the targets 22. In such manner, the cooperative users 26 may be given a variety of combined information regarding the targets 22, as obtained by the plurality of geographically distributed sensors 12, in order to give the cooperative users 26 a complete picture regarding the targets 22. This may be beneficial during combat.

One or more embodiments of the disclosure may reduce and/or eliminate one or more problems associated with one or more of the prior art apparatus. Combining information from different types of geographically distributed sensors 12 may provide improved sensing capability, may provide more accurate sensing capability, may reduce the weight, size, and volume of the sensing platforms, may provide multiple line of sign sensing to allow for the generation of three dimensional images as well as the superposition of different sensing information (spectral versus image) for enhanced target information, and/or may provide other types of advantages.

It should be understood, of course, that the foregoing relates to exemplary embodiments of the disclosure and that modifications may be made without departing from the spirit and scope of the disclosure as set forth in the following claims.

The invention claimed is:

1. A free-space sensor network comprising:
a plurality of geographically distributed free-space sensors for sensing at least one target, wherein at least two of the sensors are of different types;
a networking apparatus for combining sensed information regarding the at least one target from the geographically distributed free-space sensors;
a target information device for communicating to at least one user the combined sensed information regarding the at least one target, from the geographically distributed free-space sensors, provided by the networking apparatus; and
at least one communication link connecting in free-space said geographically distributed sensors, said networking apparatus, and said target information device.

2. The free-space sensor network of claim 1 wherein each of the geographically distributed free-space sensors comprises at least one of an imaging sensor and a spectral sensor.

3. The free-space sensor network of claim 1 wherein the networking apparatus comprises at least one free-space optical communications network for allowing a plurality of cooperative users to communicate, wherein said at least one free-space optical communications network comprises a plurality of free-space multi-channel relay converters for tracking the plurality of cooperative users and a connection system for aligning the plurality of free-space multi-channel relay converters with one another to allow the plurality of cooperative users to communicate.

4. The free-space sensor network of claim 1 wherein the networking apparatus comprises at least one processor.

5. The free-space sensor network of claim 1 wherein the target information device comprises at least one of a display, an audio device, a processor, an aircraft, a spacecraft, a satellite, a rocket, a missile, a ship, a submarine, a tank, and a vehicle.

6. The free-space sensor network of claim 1 wherein the at least one communication link comprises at least one of an optical laser and a radio frequency link.

7. The free-space sensor network of claim 1 wherein the free-space sensor network is at least one of in, over, under, and on at least one of space, air, ground, and water.

8. A free-space combat sensor network comprising:
a plurality of geographically distributed free-space sensors for sensing at least one combat target;
a networking apparatus for combining sensed information regarding the at least one combat target from the geographically distributed free-space sensors, wherein the networking apparatus comprises at least one free-space optical communications network for allowing a plurality of cooperative users to communicate;
a combat target information device for communicating to at least one user combined sensed information regarding the at least one combat target, from the geographically distributed free-space sensors, provided by the networking apparatus; and
at least one communication link connecting in free-space said geographically distributed sensors, said networking apparatus, and said combat target information device.

9. The free-space combat sensor network of claim 8 wherein each of the geographically distributed free-space sensors comprises at least one of an imaging sensor and a spectral sensor.

10. The free-space combat sensor network of claim 8 wherein said at least one free-space optical communications network comprises a plurality of free-space multi-channel relay converters for tracking the plurality of cooperative users and a connection system for aligning the plurality of free-space multi-channel relay converters with one another to allow the plurality of cooperative users to communicate.

11. The free-space combat sensor network of claim 8 wherein the networking apparatus comprises at least one processor.

12. The free-space combat sensor network of claim 8 wherein the combat target information device comprises at least one of a display, an audio device, a processor, an aircraft, a spacecraft, a satellite, a rocket, a missile, a ship, a submarine, a tank, and a vehicle.

13. The free-space combat sensor network of claim 8 wherein the at least one communication link comprises at least one of an optical laser and a radio frequency link.

14. The free-space sensor network of claim 8 wherein the free-space combat sensor network is at least one of in, over, under, and on at least one of space, air, ground, and water.

15. A method of communicating over a free-space network, the method comprising:
sensing at least one target using a plurality of geographically distributed free-space sensors;
sending sensed target information regarding the at least one target from the geographically distributed free-space sensors over at least one communication link to a networking apparatus;
combining the sensed target information regarding the at least one target using the networking apparatus; and
communicating the combined sensed target information regarding the at least one target to a user through a target information device.

16. The method of claim 15 wherein the sensing step further comprises sensing at least one combat target using different types of geographically distributed free-space sensors comprising at least one of an imaging sensor and a spectral sensor.

17. The method of claim 15 wherein the sensed target information comprises at least one of a real-time location, a direction, an orientation, a speed, and an identification of said at least one target, and the communication link comprises at least one of an optical laser and a radio frequency link.

18. The method of claim 15 wherein the networking apparatus comprises at least one of a processor and a free-space optical communications network, wherein said at least one free-space optical communications network comprises a plurality of free-space multi-channel relay converters and a connection system comprising an internal alignment reference and steering mirrors.

19. The method of claim 15 wherein the target information device comprises at least one of a display, an audio device, a processor, an aircraft, a spacecraft, a satellite, a rocket, a missile, a ship, a submarine, a tank, and a vehicle.

20. The method of claim 15 wherein the method is used to communicate information regarding a combat target to a friendly user at least one of in, over, under, and on at least one of space, air, ground, and water.

\* \* \* \* \*